United States Patent
Grahn

(10) Patent No.: US 11,459,004 B2
(45) Date of Patent: Oct. 4, 2022

(54) ENERGY DISSIPATING DEVICE SUITABLE TO BE USED AS PART OF A CONNECTION DEVICE THAT CONNECTS A FIRST CAR OF A MULTI-CAR VEHICLE WITH A SECOND CAR OF A MULTI-CAR VEHICLE AND METHOD FOR DISSIPATING ENERGY IN A CONNECTION DEVICE

(71) Applicant: DELLNER COUPLERS AB, Falun (SE)

(72) Inventor: Arvid Grahn, Falun (SE)

(73) Assignee: Dellner Couplers AB, Falun (SE)

( * ) Notice: Subject to any disclaimer, the term of this patent is extended or adjusted under 35 U.S.C. 154(b) by 293 days.

(21) Appl. No.: 16/491,847

(22) PCT Filed: Mar. 1, 2018

(86) PCT No.: PCT/EP2018/055096
§ 371 (c)(1),
(2) Date: Sep. 6, 2019

(87) PCT Pub. No.: WO2018/162327
PCT Pub. Date: Sep. 13, 2018

(65) Prior Publication Data
US 2021/0139058 A1 May 13, 2021

(30) Foreign Application Priority Data
Mar. 6, 2017 (EP) .................................... 17000332

(51) Int. Cl.
*B61G 11/16* (2006.01)
*B61G 9/10* (2006.01)
(Continued)

(52) U.S. Cl.
CPC ................ *B61G 11/16* (2013.01); *B61G 9/04* (2013.01); *B61G 9/10* (2013.01); *F16F 7/12* (2013.01); *B60Y 2200/30* (2013.01)

(58) Field of Classification Search
CPC .......... B61G 11/16; B61G 9/10; B61G 11/12; B61G 11/14; B61G 11/18; B61G 9/04;
(Continued)

(56) References Cited

U.S. PATENT DOCUMENTS 3,741,406 A * 6/1973 Anderson ................ B61G 9/10
213/22
7,537,127 B2 * 5/2009 Hogbring .................. B61G 9/06
213/62 R
(Continued)

FOREIGN PATENT DOCUMENTS

DE 747330 C * 9/1944 ............. B61G 11/16
DE 747330 C 9/1944
(Continued)

OTHER PUBLICATIONS

International Search Report issued on PCT application No. PCT/EP2018/055096 dated May 18, 2018.

*Primary Examiner* — S. Joseph Morano
*Assistant Examiner* — Cheng Lin
(74) *Attorney, Agent, or Firm* — Howard IP Law Group, PC

(57) ABSTRACT

The invention relates to an energy dissipating device suitable to be used as part of a connection device that connects a first car of a multi-car vehicle with a second car of the multi-car vehicle, comprising a plug that has a longitudinal axis and a mandrel that has an opening, whereby the plug is arranged to be moved at least partially through the opening, if a force pointing in the longitudinal axis is applied to the plug, and whereby at least a part of the plug—especially its hull—is deformed, when the plug is at least partially moved (Continued)

through the opening, whereby said hull being at least partially deformed, when the plug is at least partially moved through the opening. The hull is attached to the rod by clamping or fixing with fasteners, preferably with protrusions around the rod and/or at least one plug or nut. The hull is a relatively independent element which can be put over a rod and therefore the hull can be mounted or unmounted subsequently to a rod without influencing the stability or main function of the connection device.

16 Claims, 1 Drawing Sheet

(51) Int. Cl.
*F16F 7/12* (2006.01)
*B61G 9/04* (2006.01)

(58) Field of Classification Search
CPC ..... B61G 11/00; F16F 7/12; F16F 7/07; F16F 7/125; F16F 7/126; B61D 15/06; B61D 17/06
See application file for complete search history.

(56) References Cited

U.S. PATENT DOCUMENTS

| 10,308,262 | B2* | 6/2019 | Westman | B61G 11/16 |
| 2007/0034468 | A1* | 2/2007 | Kemper | F16F 7/125 |
| | | | | 188/377 |
| 2009/0008963 | A1* | 1/2009 | Lindner | B61G 7/10 |
| | | | | 296/187.03 |
| 2015/0014267 | A1* | 1/2015 | Creighton | B61G 9/10 |
| | | | | 213/65 |
| 2017/0197641 | A1* | 7/2017 | Grahn | B61G 11/16 |

FOREIGN PATENT DOCUMENTS

| EP | 1312527 | A1 | 5/2003 |
| EP | 1752353 | A1 | 8/2005 |
| EP | 1663755 | A1 | 6/2006 |
| EP | 2949539 | A1 | 12/2015 |
| WO | 2005023618 | A1 | 3/2005 |
| WO | 2005075272 | A1 | 8/2005 |

* cited by examiner

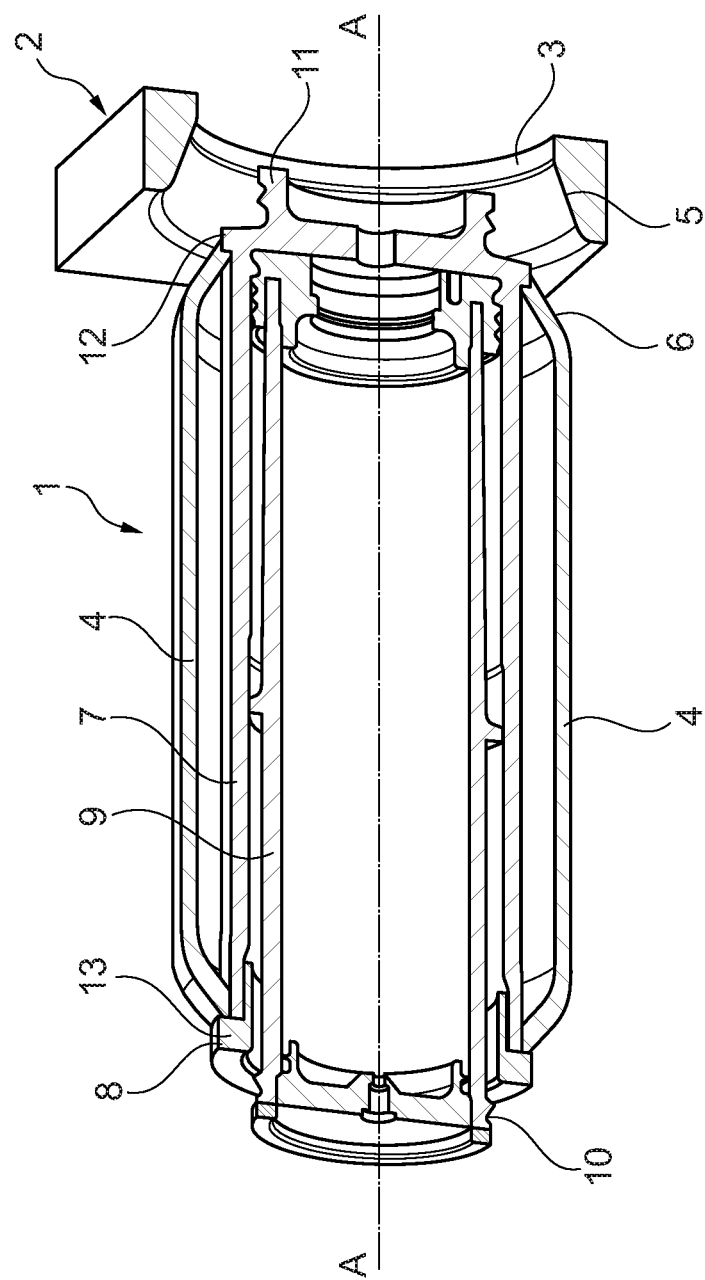

ENERGY DISSIPATING DEVICE SUITABLE TO BE USED AS PART OF A CONNECTION DEVICE THAT CONNECTS A FIRST CAR OF A MULTI-CAR VEHICLE WITH A SECOND CAR OF A MULTI-CAR VEHICLE AND METHOD FOR DISSIPATING ENERGY IN A CONNECTION DEVICE

CROSS-REFERENCE TO RELATED APPLICATIONS

This application is the national stage application under 35 U.S.C. § 371 of International Application No. PCT/EP2018/055096 filed on 1 Mar. 2018, and claims the benefit of EP 17000332.1 filed on 6 Mar. 2017, the entire disclosures of which are incorporated herein by reference in their entireties.

FIELD OF THE INVENTION

The invention relates to an energy dissipating device suitable to be used as part of a connection device that connects a first car of a multi-car vehicle with a second car of the multi-car vehicle. The invention also relates to a connection device suitable to connect a first car of a multi-car vehicle with a second car of the multi-car vehicle. The invention also relates to a method for dissipating energy in a connection device.

BACKGROUND OF THE INVENTION

Multi-car vehicles are known in different designs and in different forms of adaptation for uses. Multi-car vehicles, for example, railway-bound trains (street cars and subway-trains also being considered as such trains) are known and are known for the purpose of transporting passengers as well as transporting goods. Further types of multi-car vehicles can be magnetic railway trains or can be buses (road buses as well as buses travelling on fixed tracks). A car of a multi-car vehicle can be a self-supporting car, whereby the car has sufficient wheels that are placed at sufficient locations such that the car can stand by itself without being supported by other cars, for example a three-wheeled car, a four wheeled car or a car with even more wheels placed at suitable locations. A car of a multi-car vehicle can also be of the non-self-supporting type, whereby the car has no wheels or only wheels provided in such number or arranged at such a place that the car cannot stand by itself, but is vertically supported by at least one neighboring car.

To form the multi-car vehicles, the individual cars of the vehicle are connected to one another by means of a connection device. The connection devices can be provided for different types of purposes. In multi-car vehicles where only one or only several of the total of cars is driven, the connection devices are provided so that a driven car can drive a non-driven car and thus ensure that the complete vehicle travels with the same speed. Connection devices are also distinguished between those connection devices that allow for an easy decoupling of the cars, whereby easy decoupling is understood to be accomplished within a couple of minutes, or for what is called "semi-permanent" coupling of the cars, for which decoupling of the cars takes efforts and usually involves the vehicle to have been transported to a specific work shop. Trains, for example, can have coupler-heads as part of their connection devices. These coupler-heads can, for example, be so called "automatic couplers" that allow decoupling within minutes.

It is known to provide connection devices that are suitable to connect a first car of a multi-car vehicle with a second car of a multi-car vehicle with energy dissipating devices. From EP 1 312 527 A1 an energy dissipating device suitable to be used as part of a connection device that connects a first car of a multi-car vehicle with a second car of the multi-car vehicle is known. The connection device in this embodiment is designed as an articulated joint. The energy dissipating device arranged as part of the connection device has an energy dissipating member in the form of a deformation tube that dissipates energy when it is deformed. The deformation tube has a first end and a second end, the first end and the second end being spaced apart from each other in a compression stroke direction, which is in line with the longitudinal axis of the articulated joint when it is in the straightened-out mode of operation. The energy dissipating device has a stopper in the form of a pressure plate. The pressure plate has a stopping surface and the first end of the energy deformation tube is in contact with the stopping surface, the stopping surface preventing that the first end moves in the compression stroke direction, because the pressure plate is screwed to flange parts surrounding the deformation tube. The energy dissipating device furthermore has a deformer, which is called guiding profile (Führungsprofil) in EP 1 312 527 A1. At one end of the guiding profile a mandrel is provided that is in contact with the second end of the deformation tube and that is held apart from the pressure plate by the deformation tube, whereby the guiding profile can be moved towards the pressure plate by application of a linear force pointing in the compression stroke direction that is larger than a predetermined threshold value and thereby the guiding profile deforms the deformation tube when moving towards the pressure plate. The mandrel moves into the deformation tube and deforms it outwardly. The guiding profile is guided on straight-line rails provided at either end of the deformation tube in the flange parts that surround the deformation tube and to which the pressure plate is fastened by screws.

From WO 2005/075272 A1 an energy dissipating device of a connection device that connects a first car of a multi-car vehicle with a second car of the multi-car vehicle is known. The energy dissipating device has an energy dissipating member in the form of a deformation tube that dissipates energy when it is deformed. The deformation tube has a flange arranged at a first end of the deformation tube, which is intended to rest against a panel of the first car. Arranged inside the deformation tube at the first end of the deformation tube is a deformer that has a mandrel arranged at its end that rests against a waist of the deformation tube whereby the diameter of the deformation tube is reduced at this waist.

An energy dissipating device suitable to be used as part of a connection device that connects a first car of a multi-car vehicle with a second car of the multi-car vehicle is also known from EP 2 949 539 A1.

The deformation tubes used as energy dissipating members in EP 1 312 527 A1, WO 2005/075272 A1 and EP 2 949 539 A1 are deformed fully with regard to their cross section. The respective mandrel deforms the complete cross section of the respective deformation tube such that in the cases of WO 2005/075272 A1 and EP 1 312 527 A1, where the mandrel is placed inside the deformation tube, the outer diameter of the deformation tube after deformation is larger than the outer diameter of the deformation tube before deformation, while at the same time the inner diameter of the deformation tube after deformation is larger than the inner diameter before the deformation. In the design known from EP 2 949 539 A1, where the mandrel is placed outside the deformation tube and the deformation tube is pushed into the opening of the mandrel, the outer diameter of the deformation tube after deformation is smaller than the outer diameter of the deformation tube before deformation, while at the same time the inner diameter of the deformation tube after deformation is smaller than the inner diameter of the deformation tube before deformation. The experience has shown that these deformation tubes are usually designed to be very heavy adding substantial weight to the connection device. Also they are sometimes difficult to assembly during manufacture and/or difficult to repair after a crash, if the respective deformation element has been deformed to dissipate energy.

SUMMARY OF THE INVENTION

Given this background, the problem to be solved by the invention is to provide an improved energy dissipating device suitable to be used as part of a connection device that connects a first car of a multi-car vehicle with a second car of the multi-car vehicle that can be built in a more lightweight manner or with higher energy dissipating capacity or that is more easily manufactured or repaired after a crash. It is also an object of the invention to suggest a connection device having such an energy dissipating device and a method for dissipating energy with such a connection device.

The general concept of the invention is to provide a hull arranged around the rod of the plug of the connection device that is moved relative to the mandrel, if a force above a certain threshold is applied to the plug and to have the hull being at least partially deformed when it is moved relative to the mandrel. When deforming the hull, preferably the effect of changing its diameter by deforming is used for dissipating energy. To achieve the energy dissipating effect, it is therefore also not necessary (but might take place, depending on the shape of the mandrel), to cut into material, i.e. to sever material from the hull.

Additionally, the invention offers the possibility to implement energy dissipation where previously energy dissipation had not been thought of. The invention allows small energy dissipation sections to be provided for at many parts that are present in a connection device anyways. For example gas hydraulic dampers: In many embodiments, gas hydraulic dampers are implemented in the coupler rod of a connection device. These gas hydraulic dampers take up some of the small forces that occur during normal travel of the vehicle and smoothen the ride. The invention allows for additional energy dissipation to made available on such gas hydraulic dampers by way of arranging a hull around the gas hydraulic damper, which takes up energy, if the gas hydraulic damper and the hull arranged around it (jointly making up an embodiment of a plug according to the invention) is at least partially moved through the opening of a mandrel arranged close to the gas hydraulic damper.

An advantage of the invention is implementing an energy dissipating device that is independent of the other elements of the connection device and can therefore be added subsequently or can be replaced individually. This will also allow saving built-length of the complete connection device and will save weight.

The energy dissipating device has a plug that has a longitudinal axis. In the context of a preferred embodiment, the plug can be a tubular object. The plug comprising the rod and the hull is described to have a longitudinal axis in order to allow a relative movement between the plug and the mandrel to be described. The use of the term "longitudinal axis" does, however, not mean that the maximum extent of the plug is necessarily in direction of the longitudinal axis. Embodiments of the invention can be thought of, where the plug has a larger extent in a direction perpendicular to the longitudinal axis than in the direction of the longitudinal axis. However, in a preferred embodiment, the maximum extent of the plug is in the direction of the longitudinal axis. In a preferred embodiment, the plug is an object with rotational symmetry with respect to the longitudinal axis. That is in a preferred embodiment there is at least one sectional plane perpendicular to the longitudinal axis in which plane the section of the plug is an object with rotational symmetry about the longitudinal axis. In a preferred embodiment, in the plurality of sectional planes perpendicular to the longitudinal axis, the respective section of the plug in that respective sectional plane is an object with rotational symmetry about the longitudinal axis. In a preferred embodiment, the longitudinal axis of the plug points in the direction of or parallel to the direction of the maximum extent of the plug. In a preferred embodiment, the longitudinal axis is co-axial or parallel to the central axis of the opening in the mandrel. In case of a non-rotational symmetry of the rod and/or the hull, these elements can be denoted as a profile.

The energy dissipating device according to the invention has a mandrel that has an opening, whereby the plug is arranged to be moved at least partially through the opening if a force of a predetermined magnitude or above a certain threshold is pointing in the direction of or parallel to the direction of the longitudinal axis is applied to the plug and whereby at least a part of the plug is deformed, when the plug is at least partially moved through the opening.

The mandrel can be part of a larger object, meaning that the mandrel can be made as one piece with other objects, for example a profile or a wall of the underframe of a car. This means that the mandrel can have a multitude of three-dimensional shapes. In a preferred embodiment that part of the mandrel that has the opening is a plate.

The opening in the mandrel preferably has the same geometric shape of the circumference of the part of the hull that forms the widest part of the hull, albeit being of smaller diameter than this widest part of the hull to allow for the hull to be deformed as it is moved at least partially through the opening. If the hull at its widest part has a circular geometric shape, the opining preferably also is circular. Matching the geometric shape of the opening and the widest part of the hull allows for a uniform deformation of the hull.

In a preferred embodiment, the plug is already partially, even if it is minimally (for example only for a few, for example 1 or 2 or 5 mm), inserted into the opening of the mandrel in the normal mode of operation of the connection device, i.e. the mode of operation where the energy dissipation by way of deforming the hull has not taken place yet. Arranging the plug to be partially inserted into the opening of the mandrel allows for the relative movement of the plug relative to the mandrel to be coordinated in a better manner. In such an embodiment, for example, a part of the surface of the hull rests against at least a part of the surface of the mandrel that encompasses the opening. In an alternative, a part of the hull that has a smaller diameter than the widest part of the hull would be arranged inside the opening in such an embodiment.

However, designs can be thought of, where the plug or at least the hull is held distanced from the opening, whereby no part of the hull would be arranged inside the opening of the mandrel. The plug or at least the hull would then first need to be moved to enter into the opening of the mandrel, if a force pointing in the longitudinal axis is applied to the plug, before deformation can begin.

In a preferred embodiment, the position of the rod and/or the hull is fixed relative to the mandrel for the modes of operation, where no force or at least no force of the predetermined magnitude has been applied to the plug pointing in the direction of or parallel to the direction of the longitudinal axis. This can be achieved in several ways.

In a first alternative a counter element can be provided on the rod, if the rod passes through the opening in this mode of operation, or on an element attached to the rod and protruding from the rod through the opening in this mode of operation, if the rod itself does not protrude through the opening in this mode of operation. This counter element can be used to sandwich the mandrel between a part of the plug arranged on the one side of the mandrel, preferably the hull that in such an embodiment would contact the mandrel with a part of its surface, and the counter element arranged on the other side of the mandrel. The contact between the parts of the plug arranged on the one side of the mandrel, preferably the hull, with the mandrel avoid that the rod and/or the hull are moved further towards the mandrel until a force of the predetermined magnitude has been applied to the plug pointing in the direction of or parallel to the direction of the longitudinal axis. The contact between the counter element arranged on the other side of the mandrel and the mandrel avoids that the rod and/or the hull are moved away from the mandrel, hence fixing the rod and/or the mandrel for such modes of operation, where no force or at least no force of the predetermined magnitude has been applied to the plug pointing in the direction of or parallel to the direction of the longitudinal axis.

In a second alternative a counter element can be provided on the rod, if the rod passes through the opening in this mode of operation, or on an element attached to the rod and protruding from the rod through the opening in this mode of operation, if the rod itself does not protrude through the opening in this mode of operation, whereby the counter element is arranged on the other side of the mandrel than the hull and whereby the counter element is in contact with an element that itself is in contact with the mandrel. For example if the mandrel makes up the front part of a box suitable to be attached to the underframe of a car and the counter element is arranged to contact the back of the box, the mandrel at least indirectly is sandwiched between a part of the plug arranged on the one side of the mandrel, preferably the hull that in such an embodiment would contact the mandrel with a part of its surface, and the counter element arranged to contact the back of the box and indirectly contacting the mandrel through the side surfaces of the box.

In a third alternative, the plug is attached to the mandrel or an element connected to the mandrel by way of tear away element that breaks (and hence breaks the connection to the mandrel), if a force of a predetermined magnitude is applied to this tear away element. Such tear away elements could, for example also be used to hold the rod or at least the hull distanced from the mandrel in the modes of operation, where no force or at least no force of the predetermined magnitude has been applied to the plug pointing in the direction of or parallel to the direction of the longitudinal axis. In a preferred embodiment of this third alternative, an element, for example a plate is arranged on the rod, if the rod passes through the opening in this mode of operation, or on an element attached to the rod and protruding from the rod through the opening in this mode of operation, if the rod itself does not protrude through the opening in this mode of operation, whereby this element, for example the plate is attached to the mandrel or an element attached to the mandrel, for example a box, by way of tear off elements, for example tear off screws. A welding that brakes, if a force of a predetermined is applied to pull apart the elements held together by the welding, could also be used as a tear off element, likewise a glue.

If in a preferred embodiment, the position of the rod and/or the hull is fixed relative to the mandrel for the modes of operation, where no force or at least no force of the predetermined magnitude has been applied to the plug pointing in the direction of or parallel to the direction of the longitudinal axis, the magnitude of the force necessary to be applied to the plug in order to move the plug at least partially through the opening depends on the type of fixing the rod and/or the hull to the mandrel. If the mandrel is directly or indirectly sandwiched between the plug, preferably the hull and a counter element, as described in the above first and second alternative, the force necessary to move the plug, preferably the hull at least partially through the opening (i.e. in the direction where the counter element is arranged) needs to be of the magnitude that deforms the part of the plug that contacts the mandrel, which is preferably the hub. Preferably the application of the force that leads to the plug, preferably the hull being moved at least partially through the opening (i.e. in the direction where the counter element is arranged) leads to a plastic deformation of the element that contacts the mandrel, preferably the hull. The magnitude of the force necessary to perform a plastic deformation of this element, especially the hull, is of course determined by the choice of material of this element, preferably the hull. In a preferred embodiment, this force is of the magnitude of more than 600 kN, preferably in between 600 to 1200 kN and even more preferred of more than 1200 kN. If the plug is attached to the mandrel or an element connected to the mandrel by way of tear away element as described in the above described third embodiment, the magnitude of force necessary to move the plug, preferably the hull at least partially through the opening, needs to be of the magnitude that destroys the tear away element. If the tear away element is made up of one or several tear away screws, this force is of the magnitude of more than 600 kN, preferably in between 600 to 1200 kN and even more preferred of more than 1200 kN.

In a preferred embodiment, the magnitude of force is at least the magnitude necessary to perform plastic deformation of the hull. The invention teaches the hull to be deformed when the plug is at least partially moved through the opening, hence identifying that the movement of the plug and the force necessary to provide for this movement need to be at a minimum such that the hull is at least partially deformed and is preferably at least partially plastically deformed.

The invention suggests to provide an outer element of the plug in form of a hull having at its widest part a diameter that is bigger than the diameter of the rod arranged inside the hull and that is bigger than the smallest diameter of the opening of the mandrel, wherein said hull is at least partially deformed for dissipating energy, when the plug is at least partially moved through the opening.

The invention teaches a rod to be provided as part of the plug. The rod inside the hull is preferably constructed to establish the main mechanical link for the transfer of forces in the connection device and is often made of a tube or a profile, whereby the rod may comprise additional elements like dampers or actuators. In an especially preferred embodiment, pulling forces are transmitted via the plug are transmitted fully or at least predominately via the rod. The rod can have a hollow member, especially a tubular hollow member. This hollow member allows for additional elements, for examples dampers to be arranged inside the hollow member.

The invention teaches a hull to be provided as outer element of the plug. The rod is arranged at least partially inside the hull. In a preferred embodiment, the hull is a hollow element, preferably a tubular element. In a preferred embodiment the hull in a cross-section perpendicular to the longitudinal axis has a circular, elliptical, square or polygonal shape. In a preferred embodiment, the geometry of the shape of the hull in a cross-section perpendicular to the longitudinal axis stays the same of the longitudinal extend of the hull. In an even more preferred embodiment, the geometry and the size of the shape of the hull in a cross-section perpendicular to the longitudinal axis stays the same over the longitudinal extend of the hull. Alternatively, the geometry of the shape of the hull in a cross-section perpendicular to the longitudinal axis stays the same over the longitudinal extend of the hull, but the size of the hull changes over the longitudinal extend of the hull, for example the size of the cross-section of the hull increases over its longitudinal extend, for example the hull widening with increased distance away from the mandrel. This can lead to the amount of deformation and hence the energy being dissipated increasing the more the hull is moved into the mandrel. Alternatively, the hull can have a front end (closer to the mandrel) and/or a back end (further way from the mandrel) that is shaped (geometry-wise and/or size-wise) differently to a main section of the hull. In a preferred embodiment that hull has a main section that has the same geometry and same size over the longitudinal extend of this main section. For example the main section has the shape of a hollow cylinder. A front end and/or a back end of the hull can be designed to taper towards the rod. Such a tapered front end and/or tapered back end can be used to facilitate the attachment of the hull to the rod. In a preferred embodiment the main section is designed to be distanced from the outer circumference of the part of the rod that is arranged inside this main section, while the front end and/or the back end of the hull is tapered to make contact with the rod, especially to rest against a protrusion or rim provided on the rod.

In a preferred embodiment, the hull is a body that apart from a front opening and an end opening, which are provided for pushing the hull over the rod, is closed. In an alternative embodiment, the hull has at least one window that allows inspection of the rod inside the hull. In an alternative embodiment, the hull has a skeleton-design of individual bars that make up the hull.

The hull preferably encompasses the rod in an original as well as used state after energy dissipation and has therefore a designated bigger diameter than the rod.

The widest diameter of the hull in a plane perpendicular to the longitudinal axis is larger than the smallest diameter of the opening of the mandrel. Given that the outer element of the plug is described to be a hull and given that the outer element of the plug need not necessarily be an object with constant diameter in a plane perpendicular to the longitudinal axis, the term "maximum diameter" is understood to be the length of that line of all lines that in a plane perpendicular to the longitudinal axis connects one point on the outer surface of the plug with a second point on the outer surface of the plug, while crossing the longitudinal axis which has the maximum length. Given that the opening of the mandrel is not required to be constant in diameter in a plane perpendicular to the longitudinal axis, the term "smallest diameter" is understood to be the length of that line of all lines that in a plane perpendicular to the longitudinal axis connects one point on the surface of the mandrel that surrounds the opening with a second point on the surface of the mandrel that surrounds the opening, while crossing the longitudinal axis, which has the smallest length.

The hull as an outer element of the plug is described to have a bigger diameter than the smallest diameter of the opening of the mandrel. This leads to the effect that as the plug is moved into the opening in the direction of its longitudinal axis, further sections of the hull are made to engage with parts of the mandrel and are thus being deformed. This enhances the total amount of energy being dissipated as the plug is moved into the opening of the mandrel.

In a preferred embodiment the hull is attached to the rod by clamping or fixing. In a preferred embodiment, the hull is clamped between two elements, preferably two elements of the rod or at least two elements attached to the rod, like nuts screwed into or onto the rod. In a preferred embodiment, the hull is clamped between elements that protrude outwardly from the rod or elements connected to the rod, preferably between elements that protrude radially outward from the rod or elements connected to the rod.

Fixing the hull to the rod can take place by providing a thread on the hull and a thread on the rod and hence by threading the hull onto the rod. For example if the hull is provided with a front end that tapers inwards and/or a back end that tapers inwards, the hull can have a inward facing thread in the front end or an inward facing thread in the back end or an inward facing thread in the front end and an inward facing thread in the back end, the inward facing threads engaging with appropriately arranged outward threads on the rod.

The fixing of the hull to the rod can also take place by way of fasteners, for examples screws, bolts and rivets that attach a part of the hull to a part of the rod. Also, wedges driven into a space between an inwardly facing surface of the hull and an outwardly facing surface of the rod can be used as fasteners.

The rod can have one or more protrusions which are preferably located on its outer surface and whereby the endpoint of the protrusion is further away from the middle axis of the rod, which is preferably the longitudinal axis, than half of the inner diameter of the hull in some of its sections such that the hull can abut against the protrusion, for example the inner diameter of the smallest section of a front end and/or a back end of the hull, if the hull is provided with a tapered front end and/or a tapered back end. Especially preferred, the endpoint of the protrusion is further away from the middle axis of the rod, which is preferably the longitudinal axis, than half of the inner diameter of the hull at one end of the hull. Therefore, it can be sufficient to have a protrusion or flange or projection on the outer surface of the rod that can be located at one or more positions on the circumference of the rod to prevent a relative movement of the hull and the rod. Another possible realisation can be a ring around the rod whose diameter is bigger than the smallest diameter of the hull. The protrusion, flange, projection or ring can be a permanent member of the rod, for example being fixedly attached to the rod or being made as one piece with a piece of a rod, for example a cast piece of the rod or a machined part of the rod. The rod can also have a recess or a notch located at one or more positions on the circumference of the rod. Together with adapter plates or rings which can be attached to one or more recess or notch, a bigger effective diameter of the rod than the smallest diameter of the hull can be achieved. Furthermore, on one or more sections or positions of the hull, its diameter can be even smaller than the outer diameter of the rod especially in order to fit into one or more recess or notch.

For fixing the hull to the rod, preferential means are reversible ones, such as clamping or the use of fasteners like screws, bolts or clip-like elements or pawls. Preferably, one or more retaining rings or nuts can be attached to the rod and/or the hull that prevent a relative movement of the rod and the hull, especially on the side facing away from the mandrel. The nut can have a clamping ring and/or a thread as affixing means. In a special embodiment the thread of the nut is on its outside circumference and the nut is screwed into a hollow section of the rod having an inner thread, wherein the nut having a retaining ring with a diameter bigger than the outer diameter of this hollow section of the rod such that the retaining ring protrudes outwardly over the outer circumference of the hollow section of the rod. It can also be thought of a nut with an outside thread and an inside thread being screwed into a space between the hull and the rod, the hull having an inward facing thread and the rod having an outward facing thread in the area of this space. A reversible fastener can also be provided by driving a wedge into a circumferential space between the hull and the rod.

In another preferred embodiment, at the side of that end where the hull is facing the mandrel, a protrusion is realised by a rim and/or a ring on the circumference of the rod which has a bigger diameter than the smallest diameter of the hull in the area of that section, but that has a smaller diameter than the smallest diameter of the opening of the mandrel.

Preferably, the hull is clamped between at least two fixing means, one located at the end facing the mandrel and another one located at the side facing away from the mandrel. It can also be thought of a realisation, where the rod is at least partly conical shaped and where its biggest diameter is bigger than the smallest diameter of the hull in order to prohibit a relative movement towards the hull.

In a preferred embodiment, the hull can be put over a rod and/or the hull can be mounted and/or unmounted subsequently to a rod. This can be basically achieved by clamping or fixing means that are reversible, i.e. the utilisation of an aforementioned nut and/or bolts and/or screws in order to lock a relative translation of the hull along the longitudinal axis at least in one direction. Primarily, reversible fixing means are needed at least on one end of the hull, either that one facing the mandrel or the other one facing away from the mandrel. Furthermore, the rod need to be of smaller diameter than the hull at least in the area of those sections, which are covered by the hull and/or those sections over which the hull is put over especially for assembling or dismantling respectively mounting or amounting the hull. Preferably, the hull is mounted or put over the rod from that side of the plug that is facing away from the mandrel until a stopper is retaining the hull. This stopper can be one of the fixing means mentioned above like one or a plurality of rims and/or rings and/or protrusions and/or a conical section of or on the rod. On that side of the hull that is facing away from the mandrel, another or a plurality of preferably reversible fixing means are attached to the hull and/or rod to prohibit a translation of the hull away from the mandrel and off the rod. In a preferred embodiment the nut is attached and/or clamped and/or screwed in the rod and/or hull, in particular from that side facing away from the mandrel. It can also be thought of i.e. a protrusion or a rim or a ring on the side facing away from the mandrel, that is not reversible attached. In this case, to put the hull over the rod, a force above a certain threshold has to be applied so that the sections of smaller diameter can slide over the said protrusion. Then, in this case, the sliding backward can be prevented by a sharper edge on the hull facing the side away from the mandrel and/or sharper edge on the protrusion facing to the mandrel.

In principle, the fixing means can also comprise (partly) non-reversible methods, i.e. welding, soldering, (adhesive) bonding or thermal treatment. Fixing the hull to the rod can also be obtained by deforming parts of the rod. For example a hull made up of a hollow cylinder can be fixed to the rod by bending the hull inwards at its front end in order to provide a tapered front end and/or bending the hull inwards at its back end in order to provide a tapered back end. If the smallest part of the inwardly bent end abuts against a protrusion or rim on the rod or engages into a recess on the outer circumference of the rod, fixing of the hull to the rod can be achieved.

The described reversible fixing means allow a fast and inexpensive handling of the hull in case of assembly and/or required exchange of the used hull. Moreover, this allows simple design and low production costs for the hull.

In another preferred embodiment, the hull is an independent element for adding energy dissipating functionality to the connection device. Preferably, it is foreseen, that the rod does not necessarily need the hull for its own stability and/or functionality. This allows the subsequent unmounting of the hull without destructing the main function of the connection device. It can also be thought of a subsequent mounting of the hull onto the connection devices of selected cars of a multi-car train in order to adapt the dissipation energy according to the number of cars respectively the connected mass, which allows more flexibility and a modular equipment or retrofit of connection devices. To ensure certain relative stability of the plug and the mandrel in case of an absent hull, the protrusions, i.e. in form of a ring or rim on the rod, at the side facing the opening of the mandrel may have such a form, that the rod basically fits into the opening of the mandrel and/or that this side of the plug facing the opening of the mandrel is more or less slightly clamped in the opening of the mandrel in order to assure a relatively stiff mechanical connection of the two elements during normal operation of the connection device.

In a further preferred embodiment, the surface of the mandrel encompasses the opening has an inclined surface facing the hull wherein said inclined surface inclines towards the longitudinal axis. By this, the plug fits better into the opening of the mandrel, which is preferably formed more or less complementary so that the inclined surface of the hull and the mandrel have basically a similar slope in the area where they get closest together. This facilitates a relatively stiff connection between the plug and the mandrel right from the beginning, that means in an unused, new state of the hull which is not deformed by energy dissipation yet. In a preferred embodiment, the inside angle between the surface of the mandrel encompasses the opening and the longitudinal axis of the plug is less than 90°, preferably less than 80°, even more preferred less than 70°, and even more preferred less than 60°, and even more preferred less than 50°, and even more preferred less than 45°, and even more preferred less than 40°.

In a preferred embodiment, the hull has an inclined surface facing the mandrel wherein said inclined surface inclines away from the longitudinal axis. Providing for such inclined fronts or such an inclined surface enhances the way that the hull is deformed as the plug with its hull is moved further into the opening of the mandrel. In a preferred embodiment, the inside angle between the inclined front and the longitudinal axis of the plug is less than 90°, preferably less than 80°, even more preferred less than 70°, and even more preferred less than 60°, and even more preferred less than 50°, and even more preferred less than 45°, and even more preferred less than 40°.

In a further preferred embodiment, the hull's diameter is reduced by the deformation during energy dissipation. The energy dissipation can be achieved by a reduction of the diameter of the hull at a significant part of the circumference. Ideally, the diameter is reduced homogeneously, whereby also a deformation resulting in form similar to a wave or a regular or irregular indentation at one or more positions can be thought of. The diameter of the hull can be reduced until it reaches the outer diameter of the rod and/or until it touches the rod in the area of the corresponding section. Further deformations besides the reduction of the diameter can comprise an extension of the diameter in several areas of the hull. In principle, it can be thought of a more or less relative residual movement of the hull relative to the rod along the longitudinal axis, which may optionally also dissipate energy mainly because of the friction during the movement. Additionally, parts of the rod can be constructed in that way, that they can also be deformed in order to dissipate energy, especially when the capacity for energy dissipation of the hull has reached its maximum.

In a preferred embodiment, the rod comprises means for damping. This can comprise the following components alone or in a combination, like one or more springs, gums, plastic components and/or containers and/or sections filled with gas or liquids allowing the adsorption or absorption of energy preferably of lower magnitude in comparison to the energy dissipation of the hull when it is being deformed.

In another preferred embodiment, the rod comprises connection means to another car. Those connection means can be attached preferably on that side of the plug that faces away from the mandrel and/or away from the corresponding car to which the energy dissipating device belongs to. The connection means can especially comprise reversible standard couplers, hooks and/or capture mechanisms, but it can also be thought of less reversible connections like another rod or prolongation attached with screws or even welded components.

In a preferred embodiment, the hull is a deformation tube. This allows a relatively simple design of the connection device.

In a preferred embodiment, the hull is made of a medium/high strength steel with good elongation properties and impact strength.

In a preferred embodiment, the mandrel is made of a high strength steel that may be surface hardened.

The connection device suitable to connect a first car of a multi-car vehicle with a second car of the multi-car vehicle according to the invention, comprises an energy dissipating device according to the invention.

The method for dissipating energy in a connection device according to the invention provides for the plug to be arranged in front of the mandrel so as to allow the plug with its hull to be moved at least partially through the opening, if a force pointing in the longitudinal axis is applied to the plug and energy is dissipated by deformation of the hull.

Below, the invention will be explained in conjunction with FIG. 1 that only shows an embodiment of the invention.

BRIEF DESCRIPTION OF THE DRAWINGS

FIG. 1 shows a perspective, partionally sectional view of an energy dissipating device according to the invention.

DETAILED DESCRIPTION OF THE INVENTION

For ease of reference, the FIG. 1 only shows the plug 1 and the mandrel 2 in a sectional view.

The plug 1 and the mandrel 2 are part of an energy dissipating device suitable to be used as part of a connection device that connects a first car of a multi-car vehicle with a second car of the multi-car vehicle. The device comprises the plug 1 that has a longitudinal axis A and the mandrel 2 that has an opening 3. The plug 1 is arranged to be moved at least partially through the opening 3 if a force pointing in the direction of or parallel to the direction of the longitudinal axis A is applied to the plug 1.

In the embodiment shown in FIG. 1, the outer part of the plug has a hull 4 that extends in the direction of the longitudinal axis A. In this embodiment, the mandrel 2 has an inclined surface 5 facing the hull 4 wherein said inclined surface 5 inclines towards the longitudinal axis A. The outside angle between the inclined surface 5 on the mandrel and the longitudinal axis A is less than 90° and about 25-30°.

As can be best seen from FIG. 1, the maximum diameter of the hull 4 in a plane perpendicular to the longitudinal axis A is larger than the minimum diameter of the opening 3 of the mandrel 2. Therefore the hull 4 will be partially deformed, when the plug 1 is at least partially moved through the opening 3. The diameter of the hull 4 is reduced and/or changed in a significant part of the hull 4, preferably simultaneously around the circumference in a relatively small section that is in contact with the mandrel 2 at the respective point of time of deformation, the small section that is presently being deformed moving along the hull 4 as the plug 1 is further pushed into the opening 3.

As can be best seen from FIG. 1, the hull 4 has an inclined surface 6 facing the mandrel 2 wherein said inclined surface inclines away from the longitudinal axis A. The hull 4 also has an inclined surface on its inside that faces the rod 7, said inclined surfaces being inclined towards the longitudinal axis A.

In FIG. 1, a rod 7 can be seen which is depicted as a tube. The rod 7 basically establishes a mechanical connection for transferring the forces between two cars in the multi-car vehicle. A significant part of the rod 7 is surrounded by the hull 4. It can be seen, that the inner diameter of the center part of the hull 4 is bigger than the outer diameter of the rod 7. Only at its ends the hull 4 is bent towards the rod 7.

Furthermore, the hull 4 is held on the rod 7 by a protrusion or rim 12 on one side closer to the mandrel 2 and a nut 8 on the other side further away from the mandrel. The nut 8 is provided to be removable. The nut 8 also has a protrusion or rim 13, holding the hull 4 on its other side and thereby fixing it to the rod 7. This may allow a later dismounting or re-mounting of the hull 4, especially without disassembling significant parts of the connection device. Both sides of the plug 1 can be connected to further connection elements 10, 11, i.e. another rod or prolongation or couplers or hooks in order to establish a mechanical link to other parts of two corresponding cars of a multicar train.

On the inner side of the rod 7 means for damping 9 can be provided that preferably adsorb or absorb energy of a lower magnitude and/or different frequency. Therefore, especially the inner volume of the rod 7 may contain damping elements, i.e. springs or flexible containers and/or volumes with gas or liquids.

The invention claimed is:

1. Energy dissipating device suitable to be used as part of a connection device that connects a first car of a multi-car vehicle with a second car of the multi-car vehicle, comprising:
   a plug that has a longitudinal axis (A); and
   a mandrel having an opening whereby the plug is arranged to be moved at least partially through the opening if a force of a predetermined magnitude pointing in the direction of or parallel to the direction of the longitudinal axis (A) is applied to the plug, and whereby at least a part of the plug is deformed when the plug is at least partially moved through the opening, wherein
   an outer element of the plug is a hull, and wherein a rod of the plug is arranged at least partially inside the hull and establishes a mechanical connection for transferring pulling forces between the first car and the second car of the multi-car vehicle, whereby the hull at the hull's widest part has a diameter greater than the smallest diameter of the opening of the mandrel, wherein the hull is deformed when the plug is at least partially moved through the opening beyond the point, when at least a part of the hull comes into contact with a surface of the mandrel surrounding the opening.

2. Energy dissipating device according to claim 1, wherein the hull is attached to the rod by clamping or fixing with fasteners attached to or held against a protrusion on the rod and/or attached to or held against a protrusion on a nut attached to the rod.

3. Energy dissipating device according to claim 1, wherein the hull is configured to be put over the rod and/or mounted and/or unmounted subsequently to the rod.

4. Energy dissipating device according to claim 1, wherein the hull is an independent element, independent from the technical functionality of the rod for adding energy dissipating functionality.

5. Energy dissipating device according to claim 1, wherein the mandrel has an inclined surface facing the hull, wherein said inclined surface inclines towards the longitudinal axis (A).

6. Energy dissipating device according to claim 1, wherein the hull has an inclined surface facing the mandrel, and wherein said inclined surface inclines away from the longitudinal axis (A).

7. Energy dissipating device according to claim 1, wherein at least a portion of the hull's diameter is reduced by the deformation during energy dissipation.

8. Energy dissipating device according to claim 1, wherein the rod comprises a damping element.

9. Energy dissipating device according to claim 1, wherein the rod comprises a mechanical connecting element to connect to another car.

10. Energy dissipating device according to claim 1, wherein the hull is a deformation tube.

11. Energy dissipating device according to claim 1, wherein the hull is made of a medium strength steel or a high strength steel.

12. Energy dissipating device according to claim 1, wherein the mandrel is made of an ultra-high strength steel.

13. Energy dissipating device according to claim 9, wherein the rod comprises a reversible coupler, a hook, or a capture mechanism.

14. Energy dissipating device according to claim 1, wherein the rod is hollow.

15. Connection device suitable to connect a first car of a multi-car vehicle with a second car of the multi-car vehicle, comprising an energy dissipating device having a plug having a longitudinal axis (A); and a mandrel having an opening, the plug arranged to be moved at least partially through the opening in response to a force of a predetermined magnitude pointing in the direction of, or parallel to, the direction of the longitudinal axis (A) being applied to the plug,
   wherein at least a part of the plug is deformed when the plug is at least partially moved through the opening, and wherein an outer element of the plug defines a hull having a rod arranged at least partially inside the hull and establishing a mechanical connection for transferring pulling forces between the first car and the second car of the multi-car vehicle, wherein the hull at the hull's widest part has a diameter greater than the smallest diameter of the opening of the mandrel,
   wherein the hull is deformed when the plug is at least partially moved through the opening beyond the point when at least a part of the hull comes into contact with a surface of the mandrel surrounding the opening.

16. Method for dissipating energy in a connection device, the method comprising:
   providing an energy dissipating device including a plug and a mandrel, wherein the plug has a longitudinal axis (A), and wherein the mandrel has an opening therein, an outer element of the plug defining a hull having a rod arranged at least partially inside the hull and establishing a mechanical connection for transferring pulling forces between a first car and a second car of a multi-car vehicle, the hull configured such that at the hull's widest part, the hull has a diameter greater than the smallest diameter of the opening of the mandrel; and
   arranging the plug in front of the mandrel so as to allow the plug with the plug's hull to be moved at least partially through the opening, in response to applying to the plug a force pointing in the direction of the longitudinal axis,
   wherein at least a part of the plug is deformed when the plug is at least partially moved through the opening, whereby energy is dissipated by deformation of the hull beyond the point when at least a part of the hull comes into contact with a surface of the mandrel surrounding the opening.

* * * * *